Oct. 21, 1952 C. J. DUMAIS 2,614,642
TANK TREAD AND DRIVING WHEEL MOUNTING
Filed Aug. 26, 1947 3 Sheets-Sheet 1

Inventor

Charles J. Dumais

By Clarence A. O'Brien and Harvey B. Jacobson
Attorneys

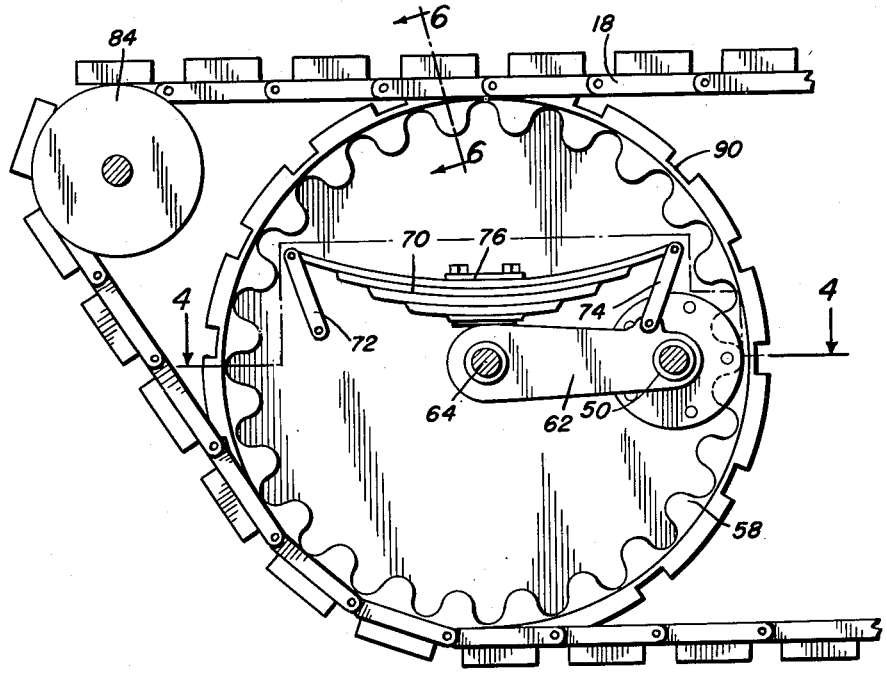
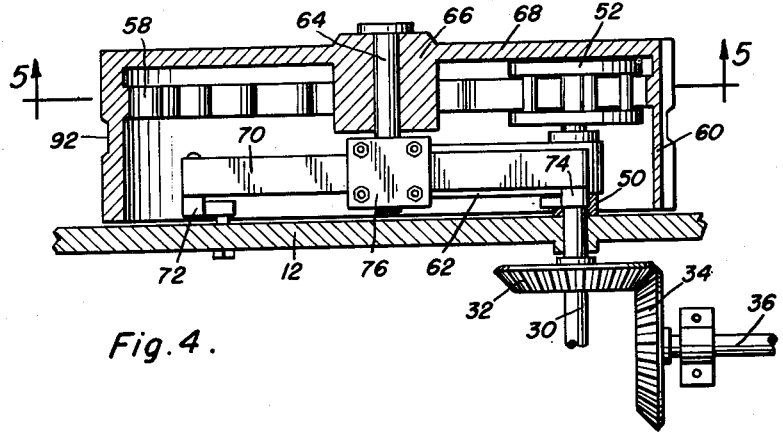

Oct. 21, 1952

C. J. DUMAIS 2,614,642

TANK TREAD AND DRIVING WHEEL MOUNTING

Filed Aug. 26, 1947

Inventor

Charles J. Dumais

By *Clarence A. O'Brien and Harvey B. Jacobson*
Attorneys

Patented Oct. 21, 1952

2,614,642

UNITED STATES PATENT OFFICE 2,614,642

TANK TREAD AND DRIVING WHEEL MOUNTING

Charles J. Dumais, Woonsocket, R. I.

Application August 26, 1947, Serial No. 770,672

4 Claims. (Cl. 180—9.1)

This invention relates to novel and useful improvements in a tank tread and driving wheel construction and the present application relates to the subject matter of my prior application Serial No. 453,744, now Patent 2,410,022.

The principal object of this invention resides in providing an improved tank tread mounting and supporting means for a tank.

An additional important purpose of the invention resides in providing a tank tread construction having an improved driving mechanism therefor.

An additional important purpose of the invention consists in providing a tank tread construction in accordance with the foregoing objects, which is provided with an improved spring mounting means for supporting the tank therefrom.

These, together with various ancillary objects of the invention which will later become apparent as the following description proceeds, are attained by this device, a preferred embodiment of which has been illustrated by way of example only in the accompanying drawings, wherein:

Figure 3 is a fragmentary enlarged vertical sectional view taken substantially upon the section line of the plane 3—3 of Figure 1 and depicting a portion of the spring suspension of the tank;

Figure 4 is a fragmentary horizontal sectional view taken substantially upon the plane of the broken section line 4—4 of Figure 3, parts being shown in horizontal section and showing some of the spring suspension and wheel driving means;

Figure 5:
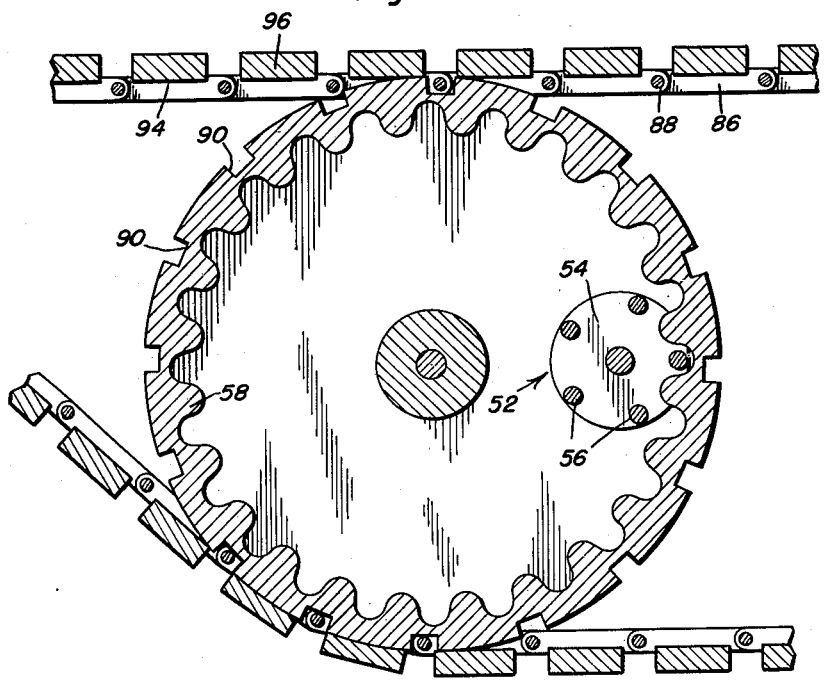
Figure 6:
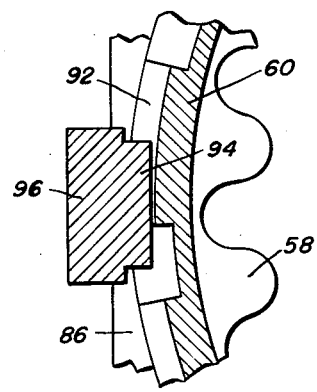

Figure 5 is an enlarged fragmentary detail view, taken substantially in vertical section upon the plane of the section line 5—5 of Figure 4 and illustrating the mounting of the endless tank tread upon a driving wheel; and Figure 6 is an enlarged fragmentary sectional view taken substantially upon the plane of the section line 6—6 of Figure 3 and illustrating the construction and engagement of the tank tread and the wheel.

Figure 1:
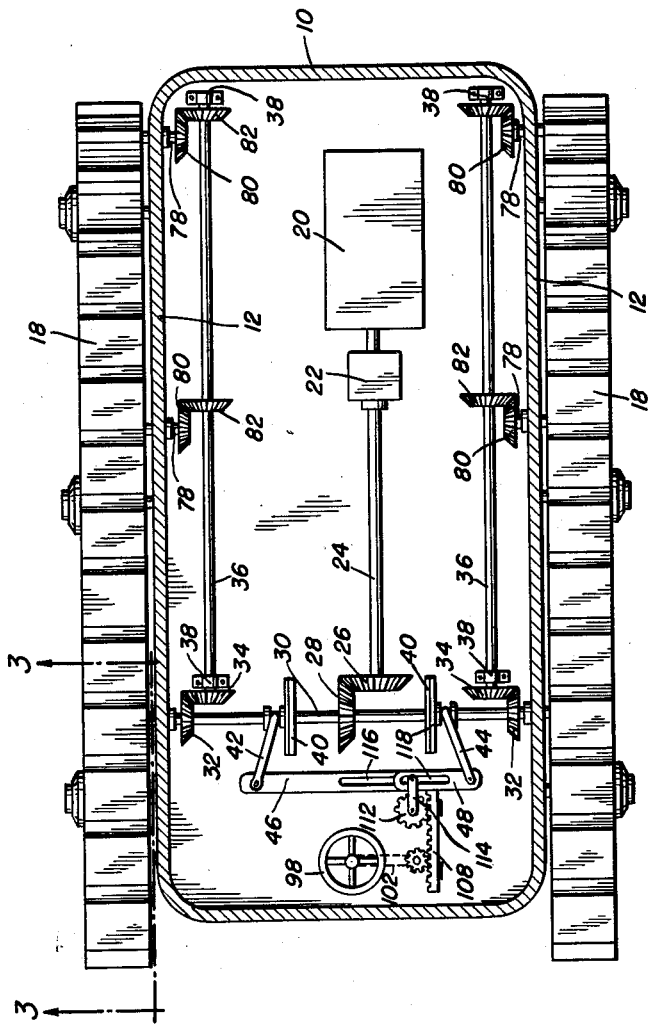
Figure 1 is a horizontal sectional view through a form of tank embodying the invention, showing diagrammatically the driving means for the tank.

Referring now more specifically to the accompanying drawings, wherein like numerals designate similar parts throughout the various views, attention is directed first to Figure 1 wherein there is disclosed an armored tank indicated generally at 10 of any conventional construction, and shown provided with side walls 12, gun turrets 14 having guns 16, and having endless treads 18 suitably carried by the side walls thereof.

As indicated diagrammatically in Figure 1, a power plant 20 of any suitable type is mounted in any convenient location within the body of the tank, and is connected as by means of a transmission and clutch 22 of any suitable design with a propeller or main power shaft 24. The propeller shaft 24 extends preferably longitudinally of the tank hull and is suitably journaled and mounted therein, in a manner not shown, and at its outer extremity is provided with a driving gear 26 which constantly meshes with a driven gear 28 rigidly attached to a transverse power shaft 30 suitably journaled in the side walls 12 of the tank hull. Adjacent the extremities of the transverse shaft 30 are provided a pair of bevel gears 32, constantly meshing with corresponding bevel gears 34 carried by lay shafts 36 journaled as at 38 to any suitable portion of the tank and extending longitudinally thereof adjacent the above mentioned side walls.

As shown diagrammatically in Figure 1, clutches 40 of any suitable construction are incorporated in the transverse shaft 30 between the driven gear 28 and the power take-off gears 32 at the extremities thereof, for selectively controlling the delivery of power from the primary power shaft 24 to the lay shafts 36. The clutches are controlled by suitable actuating arms 42 and 44, respectively, which are pivotally connected to operating rods 46 and 48, respectively, to be referred to hereinafter.

It may thus be seen that by selective operation of the bars or links 46 and 48, the appropriate clutches 40 may be manipulated for selectively operating the lay shafts 36 from the constantly rotating power shaft 24, whereby the corresponding tank tread 18 may be operated for steering the tank in a manner to be now set forth.

Figure 2:
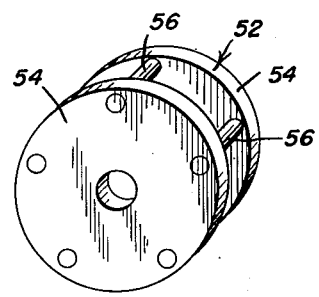
Figure 2 is a perspective view of a cogwheel constituting a part of the wheel driving mechanism of the tank tread.

For a better understanding of the tank tread driving and supporting means, attention is now directed more specifically to Figures 3 and 4, taken in conjunction with Figure 1, from which it will be understood that the transversely disposed shaft 30 extends through the side walls 12 of the tank hull and the outer extremities of said transverse shaft constitute driving axles for the foremost or forwardly disposed driving wheels on each side of the tank. As shown in Figures 3 and 4, the outer extremities of the shaft 30 extend through external bearing bosses 50 suitably mounted upon the outer surface of the tank hull, and at their outer extremities are provided with cog wheels 52 whose construction is shown in Figure 2. These cog wheels have parallel circular plates 54 rigidly connected in spaced relation by laterally extending pins 56 which constitute the cog teeth for driving engagement with an internal gear 58 formed upon the inner surface of the annular, drum-like flange 60 of a driving wheel. A supporting arm 62 is journaled at one end upon the external boss 50 and at the other end supports a stub axle 64 which rotatably receives the hub 66 of the driving wheel 68.

As shown more clearly in Figure 3, a semi-elliptical leaf spring 70 of any suitable construction is pivotally supported at its ends as by means of shackles 72 and 74 which are respectively journaled in the side wall 12 of the hull of the tank and to the end of the supporting arm 62 adjacent the boss 50. As will be seen by reference to Figure 4, the shackle 72 comprises a crankshaft having one arm pivoted to the end of the spring 70 and the other arm pivotally mounted in the side wall 12. Intermediate its ends, the leaf spring 70 is clamped as at 76 to the outer extremity of the arm 62 and the stub axle 64, whereby the weight of the tank is transmitted to the stub axle 64 of the wheel 68 through the pivotal engagement of one end of the leaf spring 70 with the tank at the boss 50, and the oscillating engagement of the other end of the spring 70 with the wall of the tank by means of the shackle 72. Thus, the body of the tank is resiliently supported upon the driving wheels. Throughout the length of each of the sides 12 of the hull of the tank, a plurality of other driving axles 78, is journaled, the extremities of these driving axles being provided with bevel gears 80 constantly in mesh with corresponding bevel gears 82 carried by the lay shafts 36. The outer extremities of the stub or drive axles 78 are suitably connected to the driving wheels which are supported and driven in the manner above set forth with regard to the forward wheels disclosed in Figures 3 and 4. It will thus be seen that the entire set of driving wheels upon one side of the tank is simultaneously operated by a lay shaft and by means of the clutches above mentioned, the two lay shafts and their associated wheels may be selectively or alternatively operated.

The endless treads 18 are entrained over the plurality of driving wheels on each side of the tank, and if desired may extend over suitable idler wheels, one of which is indicated at 84 in Figure 3.

For a better construction of the driving wheels and their association with the endless treads, attention is now directed chiefly to Figures 4, 5 and 6. In accordance with conventional design, the endless tread is made up of a plurality of links 86 pivoted together as by pins 88, which pins are engageable in transversely disposed grooves 90 formed in the outer circumference of the flange 60 of the wheel 68. Thus, as the wheels rotate, the engagement of the grooves 90 and pins 88 causes rotation of the endless tread thereabout. A peripheral groove 92 is formed in the outer circumference of the flange 60, and this groove receives inwardly extending guide lugs 94 carried by cleats 96 secured to the links of the chain tread.

Thus, as the supporting wheels and endless tread revolve, the inwardly extending lug portions 94 travel in the circumferential groove 92 and serve to guide and retain the tread upon the driving wheels. Attention is now directed again to Figure 1 for further consideration of the steering control means of the invention. A steering wheel 98 or other suitable control, is provided upon a steering shaft mounted in any suitable position and manner within the tank, which shaft is connected as by a chain drive 102 with a vertically extending shaft provided with a pinion.

The pinion is in constant mesh with a rack bar 108 slidably mounted and guided by suitable supports secured to the framework of the tank hull. The rack bar engages operatively a pinion 112 having a crank arm 114 attached thereto, the inturned end of which is loosely received in slots 116 and 118 formed in the adjacent ends of the clutch operating links 46 and 48 above mentioned. The slots are of sufficient size and so proportioned as to provide a lost motion connection for the arm 114, whereby when the latter is selectively rotated by means of the wheel 98, chain drive 102 and pinion and rack, the operating levers 42 and 44 may be alternately operated at opposite extremes of travel of the arm 114 in the slots 116 and 118, to individually and alternatively engage the clutches 40, and thus selectively operate the tread 18 on one side or the other of the tank. Obviously, by operating one tread while the other remains stationary, the vehicle is caused to turn about the stationary tread. If desired, by virtue of the lost motion connection of the slots 116 and 118, both treads may be simultaneously operated or disconnected from the power shaft 24.

From the foregoing, it is believed that the manner of operating the invention and the advantages derived therefrom will be readily understood after a consideration of the foregoing specification and attached drawings, which are to be considered as illustrative of the principles of the invention only. It is not desired to limit the invention to the exact construction shown and described, but all suitable modifications may be resorted to falling within the scope of the appended claims.

What is claimed as new is:

1. In a tank having a set of driving wheels and a driving axle operatively connected to each wheel; a means for resiliently mounting said wheels on the side walls of the tank comprising stub axles rotatably journaled in said wheels, leaf springs carried by said stub axles, means provided exteriorly of and mounted upon the side walls of said tank receiving each of said driving axles, arms pivoted on said means and having portions journalling said stub axles, and means terminally pivoting said springs to said arms and to the side walls of the tank.

2. The combination of claim 1 wherein said last-named means includes shackles.

3. The combination of claim 1 wherein said first-named means includes an external boss.

4. The combination of claim 3 wherein said last-named means includes shackles.

CHARLES J. DUMAIS.

REFERENCES CITED

The following references are of record in the file of this patent:

UNITED STATES PATENTS

| Number | Name | Date |
|---|---|---|
| 1,091,998 | Allen | Mar. 31, 1914 |
| 1,157,319 | Maniscalco | Oct. 19, 1915 |
| 1,305,505 | Townsend | June 3, 1919 |
| 1,350,071 | Davies | Aug. 17, 1920 |
| 1,405,763 | Dargert | Feb. 7, 1922 |
| 1,673,875 | Knox | June 19, 1928 |
| 1,677,878 | Leake | July 17, 1928 |
| 1,975,794 | Knox et al. | Oct. 9, 1934 |
| 2,011,565 | Barnes | Aug. 20, 1935 |
| 2,410,022 | Dumais | Oct. 29, 1946 |
| 2,418,186 | Mehn et al. | Apr. 1, 1947 |

FOREIGN PATENTS

| Number | Country | Date |
|---|---|---|
| 551,938 | Germany | June 8, 1932 |
| 653,292 | France | Nov. 8, 1928 |